(No Model.) 6 Sheets—Sheet 2.

E. A. FORD.
TYPE WRITING MACHINE.

No. 456,808. Patented July 28, 1891.

WITNESSES:
Paul Johst
C. Sedgwick

INVENTOR:
E. A. Ford
BY Munn & Co
ATTORNEYS

THE NORRIS PETERS CO., PHOTO-LITHO., WASHINGTON, D. C.

(No Model.)

E. A. FORD.
TYPE WRITING MACHINE.

No. 456,808. Patented July 28, 1891.

WITNESSES:
Paul Johst
E. Sedgwick

INVENTOR:
E. A. Ford
BY Munn & Co.
ATTORNEYS (No Model.) 6 Sheets—Sheet 4.

E. A. FORD.
TYPE WRITING MACHINE.

No. 456,808. Patented July 28, 1891.

WITNESSES:
Paul Johst
C. Sedgwick

Fig. 11.

INVENTOR:
E. A. Ford
BY Munn & Co
ATTORNEYS (No Model.) 6 Sheets—Sheet 5.

E. A. FORD.
TYPE WRITING MACHINE.

No. 456,808. Patented July 28, 1891.

WITNESSES:
Paul Jobst
C. Sedgwick

INVENTOR:
E. A. Ford
BY
Munn & Co
ATTORNEYS

(No Model.) 6 Sheets—Sheet 6.

E. A. FORD.
TYPE WRITING MACHINE.

No. 456,808. Patented July 28, 1891.

WITNESSES:
Paul Johst
C. Sedgwick

INVENTOR:
E. A. Ford
BY
Munn & Co.
ATTORNEYS

UNITED STATES PATENT OFFICE.

EUGENE A. FORD, OF NEW YORK, N. Y.

TYPE-WRITING MACHINE.

SPECIFICATION forming part of Letters Patent No. 456,808, dated July 28, 1891.

Application filed September 4, 1890. Serial No. 363,955. (No model.)

*To all whom it may concern:*

Be it known that I, EUGENE A. FORD, of the city, county, and State of New York, have invented a new and Improved Type-Writer, of which the following is a full, clear, and exact description.

Reference is to be had to the accompanying drawings, forming a part of this specification, in which similar letters of reference indicate corresponding parts in all the figures.

The object of my invention is to construct a type-writer in which a large number of characters or letters may be printed without the necessity of multiplying keys.

The object is, further, to provide means for automatically moving the inked ribbon and for shifting the inked-ribbon-moving mechanism, so as to cause the ribbon to unwind from the full reel and wind upon the empty one.

The object is, further, to furnish a simple and efficient paper-carriage for carrying the paper for receiving the impression from the type, and, further, to provide a finger-key specially adapted to rapid work, the key being so formed as to allow the finger to readily slip from its edge after the key is depressed.

My invention consists in a series of tubular type-arms carrying spindles having on their free ends heads furnished with different type and different sides and on the opposite ends segmental pinions, a circular rack adapted to engage the segmental pinions in any position in which they may be placed, a locking and a releasing mechanism for controlling the motion of the circular rack, a double-acting key, and a system of levers for moving the circular rack in one direction or the other.

It also consists in a pair of inked-ribbon reels mounted loosely on the shaft, and a clutch carried by the shaft for engaging the reels in alternation.

It also consists in mechanism for imparting motion to the shaft of the inked-ribbon reels, and in other details of construction hereinafter more fully described.

Figure 11:
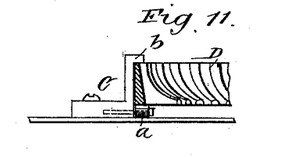
Fig. 11 is a detailed sectional view of a portion of the circular rack, showing its roller-support.
Figure 12:
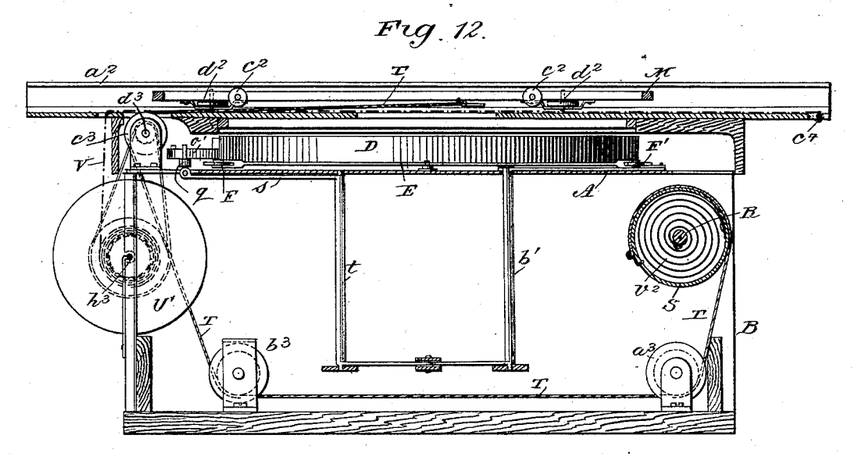
Fig. 12 is a vertical transverse section of the machine with the type-levers removed.
Figure 13:
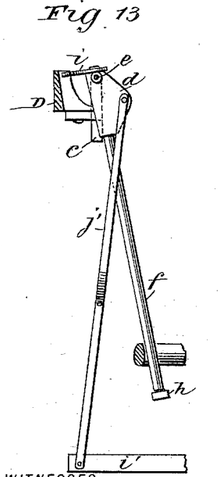
Fig. 13 is a side elevation of one of the type-levers, showing the circular rack in section.
Figures 14, 15, 16, 17:
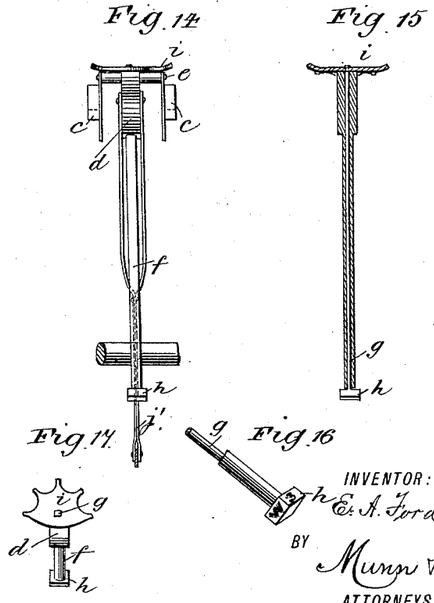
Fig. 14 is a front elevation of one of the type-levers.
Fig. 15 is a longitudinal section of the same.
Fig. 16 is a perspective view of the head or type end of the type-lever.
Fig. 17 is a perspective view, looking downwardly, of one of the type-levers.
Figure 18:
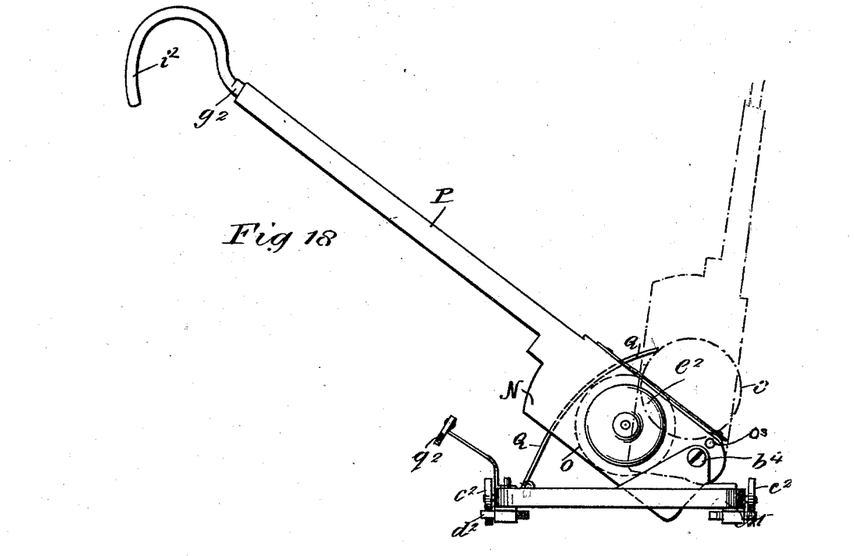
Fig. 18 is an enlarged end elevation of the paper-carriage, showing the paper-roll partly elevated in full lines and fully elevated in dotted lines.
Figure 19:
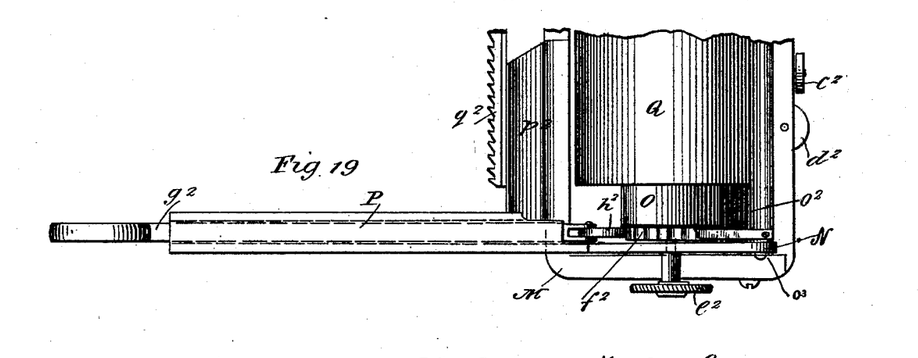
Fig. 19 is a plan view of one end of the paper-carriage, showing the pawl-and-ratchet mechanism.
Figure 20:
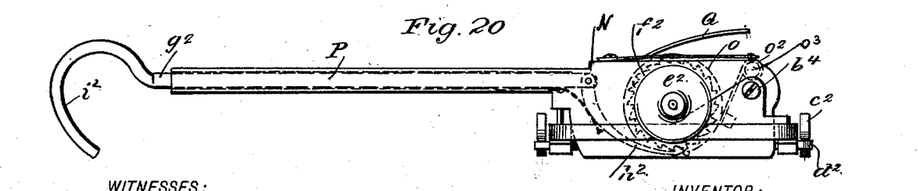
Fig. 20 is an end elevation of the paper-carriage, showing the pawl-and-ratchet mechanism in dotted lines.

Upon a horizontal plate A, supported by the frame B, are mounted right-angle arms C, arranged symmetrically around the circular opening of the plate A. Each arm C is furnished with a roller *a*, Fig. 11, near its base and with a lug *b* at its upper end. A circular rack D is supported by the rollers *a* and guided and held in place by the arms C. To the inner lower edge of the apertured plate A are secured brackets *c*, in which are pivoted triangular blocks *d* upon the pins *e*, passing through the brackets and through the triangular blocks. A tube *f* is formed integrally with the triangular block *d* and contains a wire *g*, which carries at its lower end a head *h* and at its upper end a segmental pinion *i*. The brackets *c* are arranged with reference to the circular rack D, so as to hold the segmental pinions *i* in engagement with the said circular rack. The teeth on the interior of the circular rack are curved inwardly, so that the segmental pinions will remain in gear with the said rack in any position in which they may be placed.

To the plate A, in front of the circular rack D, is pivoted a lever E, and in a similar manner at the rear of the circular rack D a lever E' is pivoted to the plate A. The ends of the levers E E' are connected by bars F F', which pass between the circular rack D and the plate A. The bars F F' are provided with studs $l\ l'$, which enter slots in the under surface of the circular rack D and serve to impart motion to the said rack when the levers E E' are moved in the manner presently to be described.

Upon one side of the circular rack D is arranged a trapezoidal block $j$, and upon opposite sides of the said block are arranged levers $k\ k'$, the outer ends of which are pivoted to the plate A, while the inner ends rest normally in contact with opposite sides of the stud $l'$. The levers $k\ k'$ are drawn toward each other by the spiral spring $m$, which is attached to both of the said levers, and said levers are guided and limited in their movement by a keeper $k^3$, fixed on the plate A. By means of this construction whenever the levers E E' are released, after having moved the circular rack in one direction or the other, the levers $k\ k'$ force the stud $l'$ into a central position and hold it normally in that position. On the opposite side of the circular rack D there is a lug $n$, having beveled ends, and to the plate A, upon opposite sides of said lug, are pivoted latches $o\ o'$, which are adapted to engage the ends of the lug $n$, and thus lock the circular rack D in a central position. A spiral spring $p$ is connected with the latches $o\ o'$ and arranged to throw the said latches into engagement with the lug $n$. A bar $q$, extending across the plate A, underneath the latches $o\ o'$, is furnished with studs $r\ r'$, adapted to strike the latches $o\ o'$ on their inner faces and disengage them from the lug $n$. The bar $q$ is pivoted to an arm $s$, secured to the upper end of a rock-shaft $t$, journaled vertically in the main frame B, the lower end of the said rock-shaft being provided with an arm $u$, which is pivotally connected to a link $v$, pivoted to the shifting-lever G. The said shifting-lever G is arranged so that when it is pushed down it will move the shifting mechanism in one direction and when it is pushed up it will move the said mechanism in the opposite direction. The bar F is connected by a link $w$ to an arm $a'$, secured to a vertical shaft $b'$, journaled in the main frame of the machine, and the lower end of said shaft $b'$ is provided with an arm $c'$, which is also connected with the link $v$. The connection of the arm $c'$ with the link $v$ is through the medium of a loop $d'$, which slides over the end of the link $v$, and a pin $e'$, which passes through a slot $f'$ in the said link, thus permitting the link $v$ to move the arm $u$ and release one of the latches $o\ o'$ before moving the bar F' through the arm $c'$, rock-shaft $b'$, arm $a'$, and link $w$.

Figure 10:
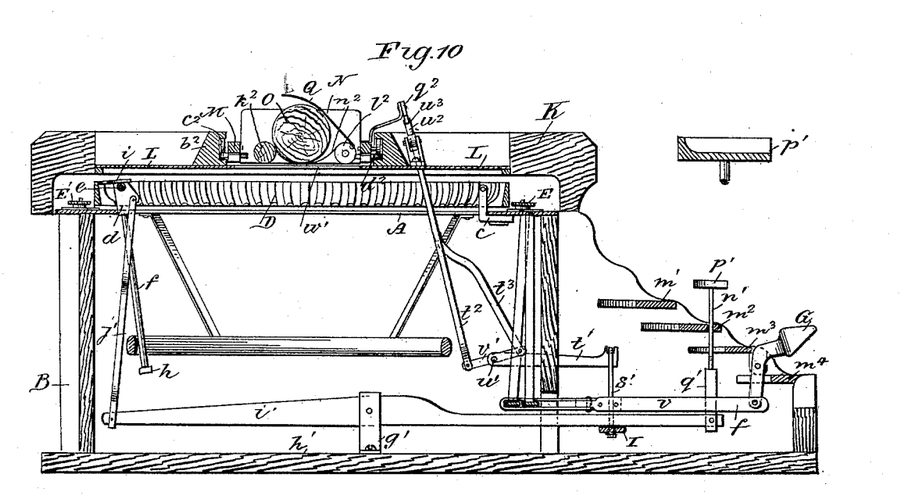
Fig. 10 is a vertical longitudinal section through the center of the machine with all but one of the type-arms removed.

In standards $g'$, attached to the base-board $h'$, are pivoted the key-levers $i'$, which extend rearwardly and are connected at their rear ends with the triangular blocks $d$ of the type-levers by means of the forked rods $j'$. The front of the main frame of the machine is provided with three outwardly-bent bars $m'\ m^2\ m^3$ and with the ledge $m^4$ for receiving the keys. The said bars are arranged one above the other and in different positions to allow the use of three banks of keys H H' H². Each key consists of a wire $n'$, having at its upper end a finger-piece $p'$ and at its lower end a fork $q'$, which is pivoted to the forward end of a key-lever. Each finger-piece is of oblong form, with the front rounded and the rear end square. The upper surface of the said finger-piece is concaved from the forward end to within a short distance of the rear end thereof, forming a scoop-shaped finger-piece, as shown in the detail sectional view, Fig. 10, to allow the finger of the operator to readily slip from the forward edge of the key.

A spacing-bar I extends across the machine, underneath the entire series of key-levers $i'$, and its ends are connected by links $s'$ with arms $t'$, attached to a rock-shaft $u'$, extending across the machine. To the said rock-shaft is secured a lever $v'$, which extends from the shaft equally in opposite directions. The lever $v'$ operates the carriage-feeding mechanism in the manner presently to be described. Besides the key-levers $i'$, which are pivoted in the standards $g'$, there are two key-levers which extend forward and are connected with the spacing-keys J. By means of this arrangement the depression of either the keys J will move the spacing-bar I without operating any of the type-levers.

In a cover K, placed on the top of the machine, is arranged a metallic plate L, having a central aperture $w'$. To the plate L, on the opposite sides of the aperture $w'$, are secured the paper-carriage guides $a^2$, each provided with a groove $b^2$ on its inner face. To the guides $a^2$ is fitted the paper-carriage M, which is furnished with friction-rollers $c^2$, fitted to the grooves $b^2$ and adapted to roll upon the bar at the bottom of the grooves. The carriage is also provided with friction-rollers $d^2$, which are arranged to turn in a horizontal plane and to bear against the guides $a^2$.

In the carriage M is pivoted a frame N, formed of end pieces adapted to support the paper-roll O and guides and guide-rolls, and a longitudinal bar $o^3$, secured in the end pieces, the said frame N being arranged to turn on screws $b^4$, passing through the ends of the carriage-frame and entering the ends N. In the said frame is journaled a paper-roll O, one of the journals of the roll being prolonged beyond the carriage and provided with a handle-wheel $e^2$, by which it may be turned. In the same end of the roll, within the frame N, a ratchet-wheel $f^2$ is secured to the journal of the roll. In a tubular guide P, extending forward from the frame N, is placed a sliding bar $g^2$, to the inner end of which is pivoted a spring-pressed hooked pawl $h^2$, which is capable of engaging the ratchet-wheel $f^2$. The outer end of the sliding bar $g^2$ is furnished with a curved handle $i^2$, by which it may be drawn outward whenever it becomes necessary to move the paper in the paper-carriage forward. The ratchet-wheel $f^2$ is prevented from retrograde motion by a flat spring $j^2$, secured to the top of the frame N. In the frame N is placed a roller $k^2$, whose journals extend through slots in the end plates of the frame N. Upon the opposite side of the paper-roll O, at opposite ends of the frame, are journaled rollers $l^2$. Rubber bands $n^2$, passing around the rollers $l^2 k^2$, tend to draw the roller $k^2$ into contact with the paper-roll O. The roller $k^2$ is grooved circumferentially at its ends, where it receives the rubber bands $n^2$, so that the bands will not interfere with the close contact of the roller $k^2$ with the paper upon the roll O. A paper-guide $o^2$, attached to the rear of the frame N, extends downward toward the roll O and serves to guide the paper so that it will enter between the roller $k^2$ and the paper-roll O. To the front of the paper-carriage M is connected a curved plate Q by means of hinges Q', the said curved plate serving to deflect the paper as it is moved forward after printing. The said curved plate Q is so proportioned that when the paper-roll O is raised for the purpose of examining the work the edge of the plate will coincide with the lower part of the line being written, and the said curved plate is furnished upon its free edge with a scale which serves as a guide in introducing or replacing the work.

Arms $p^2$, attached to the carriage M, extend upwardly and forwardly over the front of the guides $a^2$ and support a ratchet-bar $q^2$, which is graduated in the same manner as the edge of the curved plate Q. In ears $r^2 r^3$, projecting from the plate L, are pivoted the arms $s^2 s^3$, which project inwardly toward each other. Rods $t^2 t^3$, pivotally connected with the lever $v'$, extend upwardly through the plate L and are pivoted to the free ends of the arms $s^2 s^3$. The upper ends of the rods $t^2 t^3$ are provided with tongues $u^2 u^3$, which are to engage the teeth of the ratchet-bar $q^2$. By virtue of the connection of the rods $t^2 t^3$ with opposite ends of the lever $v'$ the tongues $u^2 u^3$ are made to work in alternation, so that each complete excursion of the lever $v'$ causes one tooth of the ratchet-bar to escape the tongues $u^2 u^3$, thus allowing the carriage to move forward one space. Underneath the plate A is journaled a shaft R, upon which is loosely placed the drum S. The said drum S contains a spiral spring $v^2$, one end of which is attached to the interior of the drum, while the opposite end is connected with the shaft R.

The rear end of the shaft R is furnished with a crank $w^2$, which is provided on its inner face with a stud $x^2$, adapted to enter any one of a series of holes in a plate $y^2$ on the back of the frame B. By means of said crank any desired tension may be put upon the spring $v^2$.

A cord T, attached to the drum S, passes under a sheave $a^3$, journaled in ears projecting from the base of the machine once across the base under the sheave $b^3$, thence upward over the sheave $c^3$, and forward to the opposite side of the machine, where the said cord is attached to the paper-carriage M at $m^5$. The spring $v^2$, being under tension, tends to draw the paper-carriage forward; but the forward movement of the paper-carriage is prevented by the tongues $u^2 u^3$ of the escape, and it is only when the ratchet-bar $q^2$ is liberated by the action of the tongues that the carriage can move forward. The sheave $c^3$ is mounted loosely upon a shaft $d^3$, journaled in ears projecting upwardly from the plate A. The shaft $d^3$ carries a ratchet $e^3$, to which is attached a pulley $f^3$. The ratchet $e^3$ is engaged by a spring-pressed click $g^3$, pivoted to the side of the sheave $c^3$. Upon a shaft $h^3$, journaled in the standards $i^3 i^4$ of the frame B, is mounted a pulley $j^3$, which receives its motion from the pulley $f^3$ through a belt $k^3$. In an arm $l^3$, projecting from the shaft $h^3$, is journaled a rock-shaft $n^3$, which is furnished upon its outer end with an angled lever $o^3$ and upon its inner end with an arm $p^3$, which is joined to a rod $q^3$, projecting through an aperture in an angled arm $w^3$, projecting at right angles to the arm $p^3$. Upon the rod $q^3$, between a shoulder formed thereon and the angled arm $w^3$, is placed a spiral spring $a^4$. By means of this arrangement the rock-shaft $n^3$ is held in either of its two positions of use. Upon the shaft $h^3$, upon opposite sides of the arm $p^3$, are arranged the inked-ribbon reels U U', which are free to turn upon the shaft $h^3$, but are prevented from moving lengthwise of the shaft. The reels U U' are furnished with wings $b^4$ on their adjacent faces, which project inwardly toward the arm $l^3$ and within the path of the arms of the angled lever $o^3$. The inked ribbon V in the present case, which is wound upon the reel U, passes upward through a slot in the plate L, thence diagonally across the plate in the path of the type-letters and between the plate L and the paper upon the roll O. It passes around a pin $c^4$ at the opposite end of the plate L, thence back over the plate at one side of the center of the plate, and downward through the slot of the said plate to the reel U', to which it is attached. The said reel U' is engaged by the angled lever $o^3$, so that whenever the shaft $h^3$ is turned the said reel will be carried forward, winding the inked ribbon upon the reel U' and unwinding it from the reel U. The turning of the shaft $h^3$ is effected through the belt $k^3$ and the movement of the sheave $c^3$ by the cord T as it draws the carriage forward in the manner before described. When all of the ribbon has been unwound from the reel U and wound upon the reel U', the pressure on the angled lever $o^3$, due to the holding of the reel U' by the ribbon, causes the said lever $o^3$ to turn with a part of a revolution against the pressure of the spring $a^4$. After the arm $p^3$ passes the line of the center the said spring $a^4$ carries the arm $p^3$ forward to the end of its stroke, thus turning the rock-shaft $n^3$ so as to bring the angled lever $o^3$ into engagement with one of wings $b^4$ of the reel U, at the same time liberating the reel U'. In this manner the further turning of the shaft $h^3$ causes the ribbon to wind upon the reel U and to unwind from the reel U'.

It will thus be seen that by my improvement a new surface of inked ribbon is constantly presented to the type. When the paper-carriage is returned to the point of starting by drawing the cord T, the spring $v^2$ is rewound on the drum S and the sheave $c^3$, by virtue of its pawl-and-ratchet connection with the pulley $f^3$, turns without moving the pulley $f^3$ or the ribbon-feeding mechanism.

Figure 1:
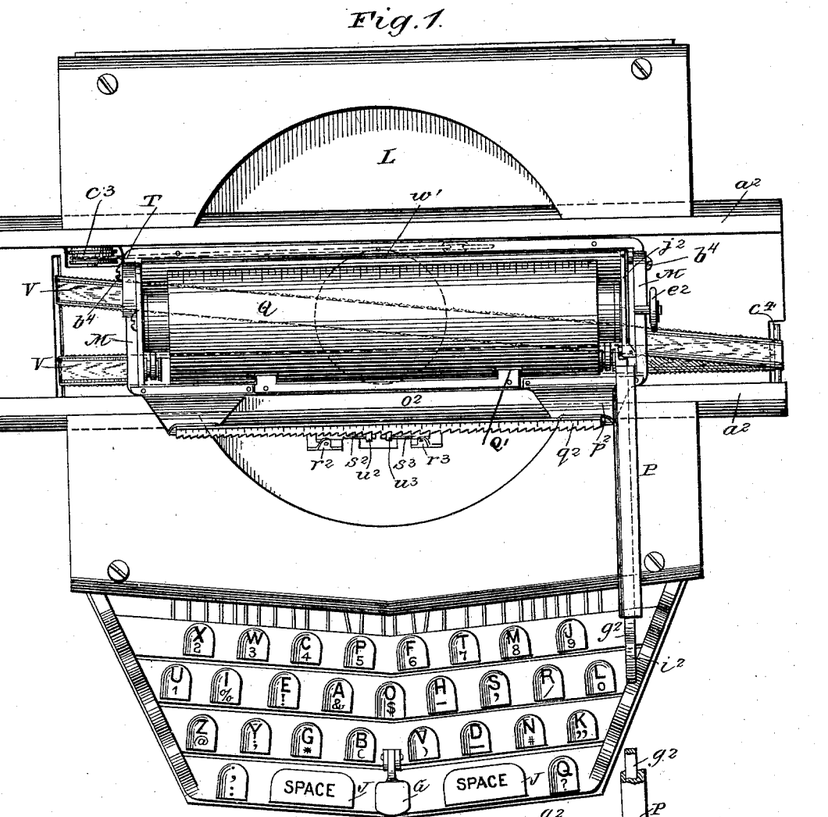
Figure 1 is a plan view of the improved type-writer.
Figure 2:
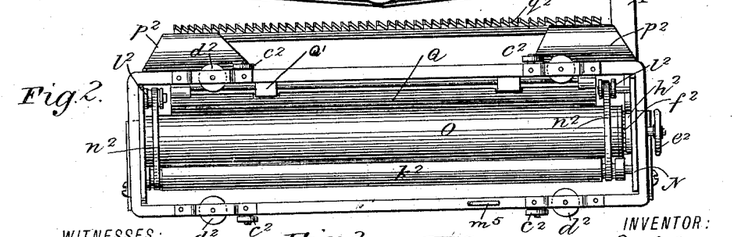
Fig. 2 is an inverted plan view of the paper-carriage.
Figure 3:
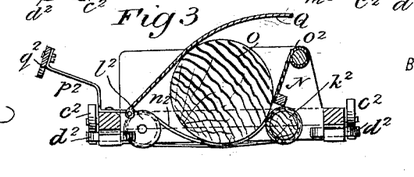
Fig. 3 is a transverse section of the paper-carriage.
Figure 4:
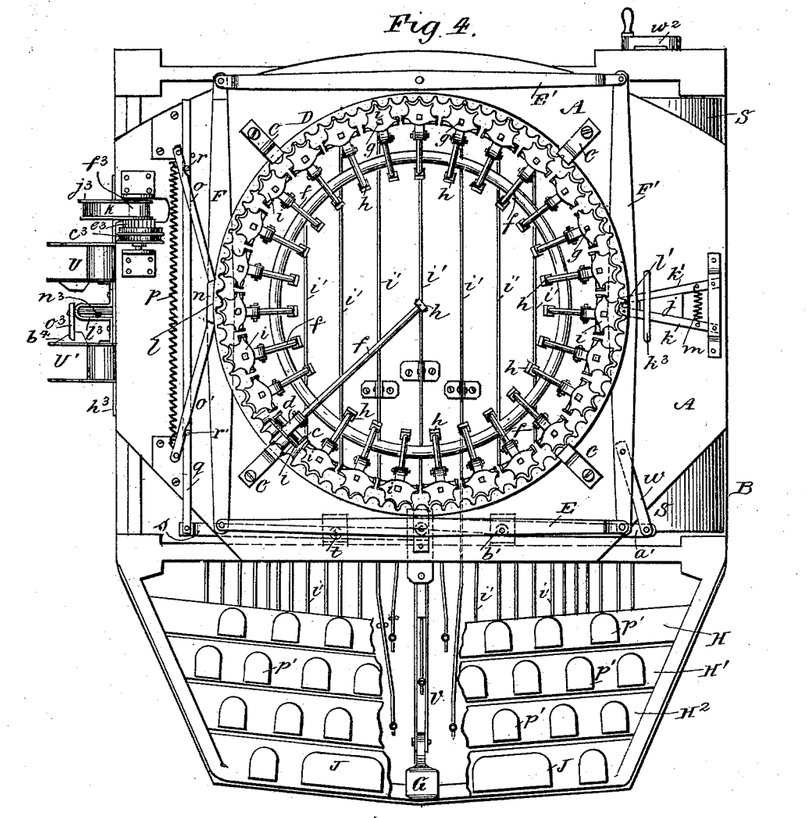
Fig. 4 is a plan view of the machine with the carriage removed and parts broken away to show internal construction.
Figure 5:
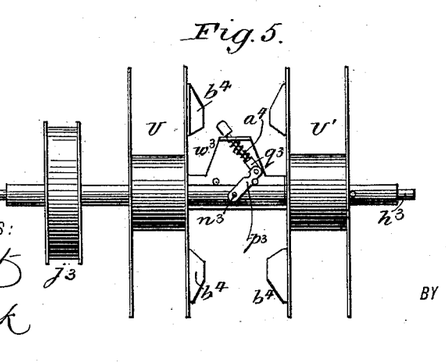
Fig. 5 is a detailed view of the inked-ribbon reels.
Figure 6:
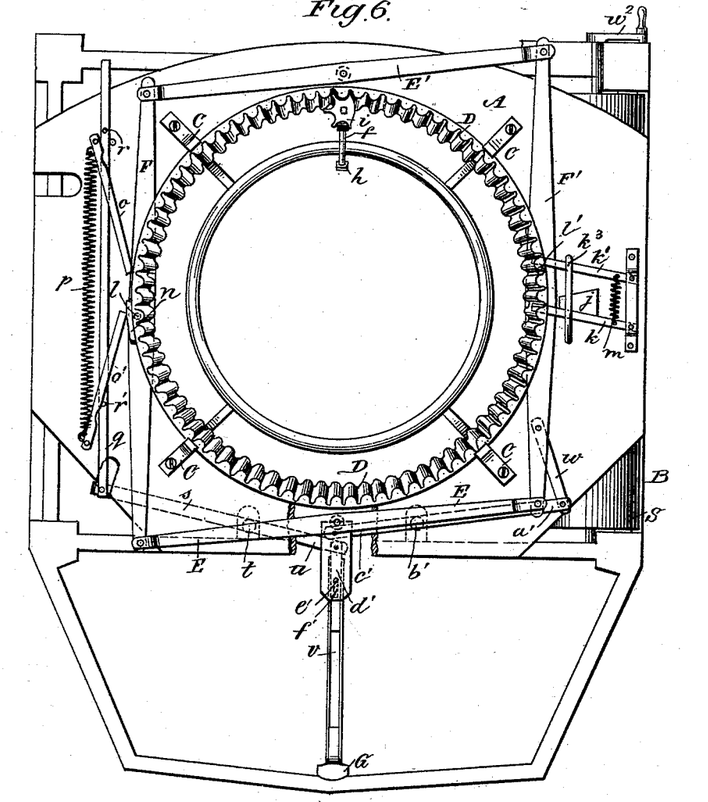
Fig. 6 is a plan view of the shifting mechanism for turning the heads of the type-arms.
Figures 7, 8:
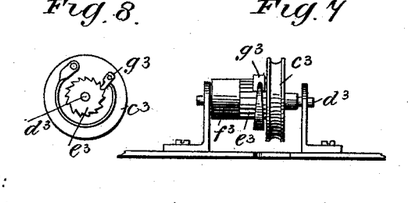
Figs. 7 and 8 are side and end elevations of the pawl-and-ratchet mechanism of the inked-ribbon feed.
Figure 9:
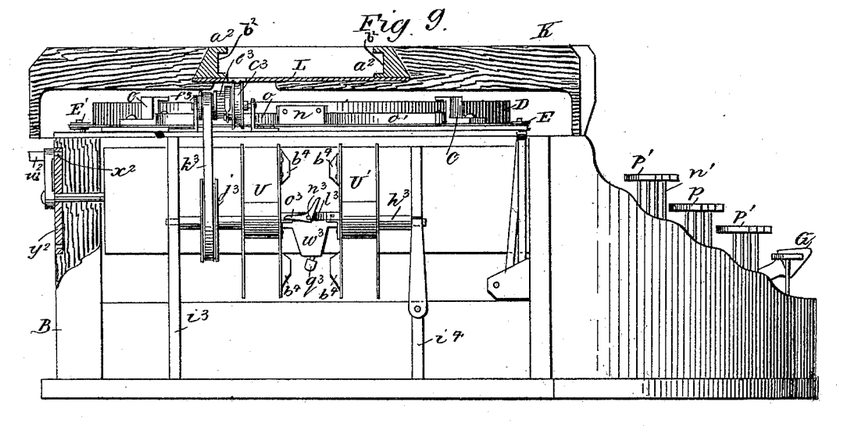
Fig. 9 is a side elevation, partly in section, showing the inked-ribbon-feed mechanism and the spring-drum for moving the paper-carriage.

It will be seen by reference to the drawings, Fig. 1, that the key-board is arranged on a phonetic basis. Eighteen letters which occur together very seldom are arranged as nearly as may be in pairs of hard and soft sounds and placed, respectively, upon the first and third rows, and those letters which usually precede and follow each of these—namely, A, E, I, O, U, S, H, R, and L—are placed on the middle row, and the remaining letter Q, like the comma, upon the fourth row, to be struck with the thumb.

As the phonetic key-board has but twenty-seven keys, each finger may be allotted its separate quota, and as these lie directly under their respective fingers and the shift-keys under the thumbs the hands are never moved out of position while writing.

My key-board is so constructed that in writing one hand will be used as much as the other, or the right hand slightly more than the left, and it is so arranged that three keys will not have to be struck consecutively with the same hand.

My improved type-writer is small and light, being only about six inches in height and ten and eleven, respectively, in width and length. The principal advantage of this is that it enables the operator to place his copy directly before him and thus avoid the constant turning of the head, as is the case with other large machines.

The possibility of the letters striking together in fast writing is reduced to a minimum, thus permitting of producing neater work at a faster rate than in other machines, and the machine has a less number of keys and prints more characters than other machines.

In my key-board the figures are placed consecutively. The , . : and ; in a group; the % or interest-mark on I; the ! on E; the & on A; the - on H; the ' on S; the ( ) on B and V; next each other; the — on D; the # or number-mark on N; the " on K; the ? on Q; the $ on O; and @ on Z.

Having thus fully described my invention, I claim as new and desire to secure by Letters Patent—

1. In a type-writer, the combination of a tubular type-lever, a spindle extending through the type-lever and provided on one end with a head furnished with type on two or more of its faces and having on the opposite end a pinion, and a circular rack having a concaved toothed inner face adapted to engage the pinion in any position the pinion may take while performing its work, substantially as specified.

2. In a type-writer, the combination, with a circular type-turning rack provided with a lug on one side thereof, of two latches oppositely arranged with respect to each other, and mechanism for disengaging the latches, substantially as specified.

3. In a type-writer, the combination, with a circular type-turning rack provided with a stud projecting from the under side thereof, of a pair of spring-pressed levers arranged on opposite sides of the stud, and a stop for limiting the motion of the levers, substantially as specified.

4. In a type-writer, the combination, with the circular rack D, of the levers E E', bars F F', the double-acting lever G, and connections between the lever G and bar F', substantially as specified.

5. In a type-writer, the combination of the circular rack D, provided with the lug $n$, the latches $o$ $o'$, the bar $q$, furnished with studs $r$ $r'$, the double-acting lever G, and connections between the lever G and bar $q$, substantially as specified.

6. In a type-writer, the combination, with the key-levers, of scoop-shaped finger-pieces secured to the said levers, whereby provision is made for permitting the fingers of the operator to slip readily from the said finger-pieces, substantially as specified.

7. The combination, in a type-writer paper-carriage, of the paper-roller O, furnished with the ratchet $h^2$, the tubular arm P, and the bar $g^2$, furnished with the hooked pawl $f^2$ for engaging the ratchet $h^2$, substantially as specified.

8. In a type-writer paper-carriage, the combination, with the paper-roll O, of the hinged curved graduated plate Q, extending from the front of the frame M over the roll O and covering the said roll, substantially as specified.

9. In a type-writer, the combination, with the rack-bar $q^2$, carried by the paper-carriage, of the pivoted arms $s^2$ $s^3$, the rods $t^2$ $t^3$, provided with tongues $u^2$ $u^3$ for engaging the ratchet-bar, the rock-shaft $u'$, provided with the lever $v'$ and arms $t'$, the space-bar I, extending under the key-levers, and the links $s'$, connecting the bar I and arms $t'$, substantially as specified.

10. In a type-writer, the combination, with the sheave $c^3$, of the pulley $f^3$, pawl-and-ratchet mechanism connecting the pulley $f^3$ and sheave $c^3$, the ink-ribbon-feeding shaft $h^3$, provided with the pulley $j^3$, and the belt $k^3$, connecting the pulleys $f^3 j^3$, substantially as specified.

11. In a type-writer, the combination of the ink-ribbon-feeding shaft $h^3$, the reels U U', mounted loosely on the shaft and provided with wings $b^4$, and the double-acting angled lever $o^2$, substantially as specified.

12. In a type-writer, a key-board having the letters arranged phonetically and distributed symmetrically with reference to their recurrence—that is to say, with the keys of the row farthest from the operator bearing the following letters and figures, respectively: X2 W3 C4 P5 F6 T7 M8 J9; the keys of the next row in front bearing the following letters and characters, respectively: U1 I% E! A& O$ H- S, R/ L°; the keys of the next row bearing the following letters and characters, respectively: Z@ Y; G* V( D— N⅞ K".

EUGENE A. FORD.

Witnesses:
 GEO. M. HOPKINS,
 C. SEDGWICK.